US006478372B1

(12) United States Patent
Lemmeyer et al.

(10) Patent No.: US 6,478,372 B1
(45) Date of Patent: *Nov. 12, 2002

(54) ARMRESTS FOR CAR SEATS (75) Inventors: Gary R. Lemmeyer, Hudson; Jerry D. Bougher, Aurora; Phillip Novak, Stow; Robert J. Warner, Jr., Akron, all of OH (US)

(73) Assignee: Graco Children's Products Inc., Exton, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,241

(22) Filed: Oct. 19, 1999

Related U.S. Application Data (60) Provisional application No. 60/136,133, filed on May 25, 1999.

(51) Int. Cl.[7] .................................................. B60N 2/28
(52) U.S. Cl. ............................... 297/188.18; 297/250.1
(58) Field of Search ..................... 297/188.14, 188.18, 297/250.1, 411.29

(56) References Cited

U.S. PATENT DOCUMENTS

| | | | | |
|---|---|---|---|---|
| 2,927,631 A | * | 3/1960 | Andersson et al. | . 297/411.29 X |
| 3,475,052 A | | 10/1969 | Kaposi | ........................ 297/153 |
| 3,542,427 A | * | 11/1970 | Herpel | ................... 297/411.32 |
| 3,992,057 A | * | 11/1976 | Studebaker | ........ 297/411.29 X |
| 4,557,452 A | | 12/1985 | Khuong | |
| 4,606,523 A | | 8/1986 | Statz et al. | |
| 4,681,367 A | * | 7/1987 | Timmers | ............ 297/411.32 X |

(List continued on next page.)

FOREIGN PATENT DOCUMENTS

| | | |
|---|---|---|
| DE | 197 55 526 | 2/1999 |
| EP | 0 644 082 A1 | 3/1995 |
| EP | 0 751 033 A2 | 1/1997 |
| JP | 10119620 | 5/1998 |

OTHER PUBLICATIONS

WPI Abstract accession No. 1998–327529 and JP 10119620—Dec. 5, 1998.
WPI Abstract accession No. 1998–122099 and DE 19755526 A [Keiper Recaro]—Nov. 2, 1999.
Photograph of portion of Century child seat, 1 page, dated Sep., 30, 1999.
Drawing of portion of overhead shield of Century child seat, 1 page, dated Sep., 28, 1999.
Futura 20/60 car seat advertisement, Fisher Price Limited, 2 pp., 1999.

Primary Examiner—Peter R. Brown
(74) Attorney, Agent, or Firm—Foley & Lardner (57) ABSTRACT A car seat includes cantilever armrests spaced from the seat portion of the car seat and adapted to receive a beverage container holder for holding juice boxes or other drinks. The cantilever armrests are attached to and extend outward from the backrest at a height above the car seat by an amount generally equal to the distance between a child's elbow and the child's seat. The child may rest his or her forearms on the armrests. The armrests may be rigidly attached or pivotally attached to the car seat. A beverage container holder is removably mounted to one of the armrests. The beverage container holder has a flange that extends parallel to a central axis of the beverage container holder and that is spaced from the outer side surface of the beverage container holder. The armrests include a receptacle, preferably a slot, to receive the flange of the beverage container holder.

13 Claims, 9 Drawing Sheets

U.S. PATENT DOCUMENTS

| | | | |
|---|---|---|---|
| 4,729,600 A | | 3/1988 | Single, II et al. ............ 297/250 |
| 4,874,203 A | * | 10/1989 | Henley ..................... 297/250.1 |
| 4,948,197 A | | 8/1990 | Sansing ....................... 297/194 |
| 5,110,184 A | | 5/1992 | Stein et al. .................. 297/349 |
| 5,232,190 A | | 8/1993 | Gould ....................... 248/311.2 |
| 5,290,092 A | | 3/1994 | Geer ...................... 297/411.32 |
| 5,294,182 A | | 3/1994 | Colasanti .................... 297/467 |
| 5,295,650 A | | 3/1994 | Brandt .................... 248/311.2 |
| 5,332,286 A | * | 7/1994 | Atherton et al. .... 297/188.14 X |
| 5,533,785 A | | 7/1996 | Gould ..................... 297/250.1 |
| 5,533,786 A | | 7/1996 | Cone, II ................ 297/256.15 |
| 5,560,680 A | | 10/1996 | Salvador et al. ........ 297/256.15 |
| 5,611,513 A | | 3/1997 | Rosen .................... 248/222.11 |
| 5,615,925 A | | 4/1997 | Kain ...................... 297/188.01 |
| 5,649,737 A | | 7/1997 | Behnke ....................... 297/170 |
| 5,662,378 A | | 9/1997 | Carruth ................. 297/256.15 |
| 5,685,604 A | | 11/1997 | Kain ...................... 297/256.15 |
| 5,720,516 A | | 2/1998 | Young .................... 297/188.18 |
| 5,797,654 A | | 8/1998 | Stroud ......................... 297/483 |
| 5,845,968 A | | 12/1998 | Lovie ...................... 297/256.1 |
| 5,865,412 A | | 2/1999 | Mason .................... 248/311.2 |

* cited by examiner

ARMRESTS FOR CAR SEATS

This application claims the benefit of U.S. Provisional Application Ser. No. 60/136,133, filed May 25, 1999 and incorporated herein by reference in its entirety.

BACKGROUND OF THE INVENTION

1. Field of the Invention

This invention relates to a child car seat for a toddler. More specifically, this invention relates to a child car seat having cantilever armrests that are spaced from the seat portion of the car seat and that are adapted to receive a beverage container holder for holding a juice box or other drink container.

2. Description of the Related Art

Child car seats appearing in the past generally have included a backrest and a seat with side panels or bolsters that extend up from the seat. U.S. Pat. No. 5,533,786 shows such a seat.

Booster car seats for older children are also known. Examples include those disclosed in U.S. Pat. Nos. 5,797,654 and 5,845,968. These booster car seats differ from the above-mentioned child car seats in that they typically do not have a backrest mounted to the seat portion. The booster seats generally include a pair of relatively short side projections that extend upward and project slightly forward from the rear edge of the seat to form guides for the vehicle's adult lap belt. Some booster car seats are provided with a cup holder arrangement mounted to a lower portion of the side wall of the seat so that the cup holder arrangement rests on the vehicle seat, as disclosed in U.S. Pat. Nos. 5,615,925 and 5,685,604.

Yet another type of child car seat is disclosed in U.S. Pat. No. 5,662,378. This car seat for a younger child includes a U-shaped shield that encircles the child and attaches at its ends to opposite sides of the backrest. The shield may be fitted with a removeable tray having sections configured to hold a cup, a bottle, or other item.

Another known child car seat, as disclosed in U.S. Pat. No. 5,560,680, includes arm members rotatably attached to a rod extending through the seat platform or seat base. These generally vertical arm members may be fitted with a recess in an upper end face to hold accessories, such as a cup. The arm members are spaced from the backrest and thus would not function as armrests upon which a child may rest the entire length of his or her forearm.

A child car seat configured to provide armrests, as opposed to side bolsters, U-shaped shields, or vertical arm members, that are equipped to hold cups or other articles within reachable distance of the child would be welcomed by consumers.

Adult chairs having armrests equipped with container holders have been recognized in the past. Such adult chairs include those disclosed in U.S. Pat. Nos. 5,110,184; 5,295,650; 5,649,737; and 5,865,412. These adult chairs may have a cup holder permanently affixed to the armrest, as seen in U.S. Pat. No. 5,110,184, or removably mounted to the armrest via a bracket, clip, or brace arrangement, as seen in U.S. Pat. Nos. 5,295,650; 5,649,737; and 5,865,412. In a different context, U.S. Pat. No. 4,208,197 discloses a child shampooing chair that is somewhat similar to an adult lawn chair. This child shampooing chair has container supports that can be snapped onto the armrests of the chair.

In vehicular and other venues, armrests or armrest frames for adult seats are known that include variously located slots or receptacles for receiving cup holders. For example, U.S. Pat. No. 5,232,190 discloses a relatively complex armrest having two elongated sides that operate in a clamshell-like motion. This armrest changes between a closed position, where the sides are adjacent one another, and an open position, where the sides are spaced from one another, to reveal a container holder. The vehicle seat disclosed in U.S. Pat. No. 5,290,092 includes an armrest with cylindrical depressions oriented such that, when the armrest is moved to a stowage position behind the backrest, the depressions are oriented vertically upward for use by a passenger seated in a backseat. U.S. Pat. No. 5,720,516 discloses a concession goods holder for use in association with an armrest positioned between adjacent seats. Armrests have also been designed with a slot for receipt of a plug capable of transmission of electronic or video signals, as disclosed in U.S. Pat. No. 5,611,513.

These known armrest arrangements in adult chairs and seats, however, may be improved upon to make them better suited for use in a child car seat. Objects, features, and advantages of the present child car seat will become apparent to those skilled in the art upon consideration of the following description of the invention.

SUMMARY OF THE INVENTION

An advantage of the present invention is to provide a child car seat for use in a vehicle that enables the child to rest his or her forearms on armrests of the child car seat. Another advantage of the present invention is to enable a child strapped in the child car seat to have easy access to beverage containers held in a beverage container holder releasably mounted to the armrest.

A child car seat in accordance with a preferred embodiment of the invention comprises a seat portion having a front edge, a back edge, and a seat bottom adapted to be placed on a seat cushion of a vehicle. The child car seat also includes a child restraint system adapted to hold a child in the child car seat. The child car seat further includes a backrest that extends upwardly from, and is contiguous with, the back edge of the seat portion. The seat portion and backrest preferably are formed as a unitary shell structure. The child car seat includes at least one cantilever armrest having a first end and a second end, with the first end of the cantilever armrest attached to the backrest. Another cantilever armrest preferably is attached to the other side of the backrest. Alternatively, a cantilever armrest is attached to one side of the backrest, and a side bolster is formed on the other side of the child car seat. The remaining discussion relates to the preferred embodiment, which has two cantilever armrests.

Each cantilever armrest is vertically spaced from the seat portion along the length of the armrest, with the length of each armrest being greater than one half a length of the seat portion from the back edge to the front edge. The cantilever armrests are located at a height above the seat portion generally equal to the distance between a child's elbow and the child's seat so that the child may rest his or her forearm on the armrest.

The cantilever armrests preferably are rigidly attached to the backrest. The first end of each cantilever armrest includes a first mounting surface, and each side of the backrest has a second mounting surface. The first mounting surface and the second mounting surface confront each other and are connectable to connect the respective armrests to the backrest at the appropriate position. More specifically, in one preferred embodiment, the first end of each cantilever armrest has a groove therein, and the backrest has a tongue formed in respective recesses on each side of the backrest. The groove in the cantilever armrest defines a U-shaped groove that opens to the first end of the armrest and that extends from the top surface to the bottom surface of the armrest. The tongue is configured to receive the groove of the respective cantilever armrests. In this embodiment, the first mounting surface comprises an inner surface of the groove, and the second mounting surface comprises a side surface of the tongue.

In another embodiment, rather than being attached in a tongue-in-groove arrangement, the cantilever armrest may be rigidly attached to a side surface of the backrest. In this embodiment, the first end of the cantilever armrest does not include a groove, and the backrest does not include tongues. In yet another embodiment, the cantilever armrests may be integrally molded to the backrest in a unitary structure formed by the seat portion, the backrest, and the cantilever armrests.

In still another embodiment of the invention, at least one, and preferably both, of the cantilever armrests may be pivotally attached to the backrest. The pivotable, cantilever armrests pivot in at least one of an upward direction and a downward direction relative to the seat portion and, in some embodiments, pivot in both directions. The cantilever armrests thus can be pivoted out of the way to create room at the side of the child car seat so that a child caregiver may easily maneuver the child into the child car seat.

The pivotable, cantilever armrests may be attached to the side surfaces of the backrest, and, from a position generally parallel to the seat portion, the cantilever armrests may be pivoted up to a generally vertically oriented position in alignment with the respective side surface of the backrest or pivoted down to a position along the respective side surface of the seat portion. The pivotable, cantilever armrests alternatively may be attached to a pivot attachment portion formed at either side of the backrest. In such an embodiment, the backrest may include a pair of recessed areas for receiving the armrests when pivoted upward, or it may include a contoured cut-out area on either side into which the armrests may pivot. For armrests that pivot downward, each side of the seat portion may include recessed areas or contoured cut-out areas, similar to those formed in the backrest in the embodiment with upward pivoting armrests.

In another aspect of the invention, at least one of the cantilever armrests has a receptacle formed therein for receiving a beverage container holder. The receptacle preferably comprises a slot formed in an upper surface of the cantilever armrests. A beverage container holder, which may be sized to receive juice boxes, flexible drink cups, and other beverage containers, has a main body configured to carry the beverage container and a flange that releasably fits into the receptacle in the cantilever armrest. The flange preferably extends downward from a top surface of the beverage container holder, in a direction parallel to a central axis of the main body, and is spaced from the main body. In an alternative embodiment, the receptacle may be formed in the front surface or in either side surface of the cantilever armrest, and the flange then extends in a direction perpendicular to the central axis of the main body for slidable receipt in the receptacle.

When soft goods or padding is placed on the child seat, the padding covers the cantilever armrests; thus, the receptacle would not be readily visible to a person looking at the cantilever armrests. The padding has a slit in juxtaposition with the receptacle, and the flange of the beverage container holder may be slid through the slit in the padding and into the receptacle.

Other techniques for attaching a beverage container holder to a cantilever armrest are contemplated by the present invention. For example, the beverage container holder may be attached to the cantilever armrest via an elastic sleeve that is attached to the beverage container holder and that slips over the cantilever armrest. The beverage container holder of this embodiment may be attached to either the left or the right armrest, depending on the preference of the child or the parent. In a car seat positioned on the left side of the car, a parent seated in the front seat may reach a beverage container mounted to the right armrest more easily. The beverage container holder also may be attached to the cantilever armrest with a hook and loop type fastening arrangement, where the cantilever armrest has a patch of either hook or loop material, and the beverage container holder has a patch of the complementary material. Still further, the cantilever armrest may be fitted with a sleeve that has a fastener to which the beverage container holder with a complementary fastener may be engaged when desired. One such fastener/complementary fastener arrangement comprises snaps. Other forms of attaching the beverage container holder to the cantilever armrest are deemed to fall within the scope of the invention.

BRIEF DESCRIPTION OF THE DRAWINGS

Other objects and advantages of the present invention will become apparent from the following detailed description of a preferred embodiment thereof taken in conjunction with the accompanying drawings, wherein.

DESCRIPTION OF THE PREFERRED EMBODIMENT

Figure 1:
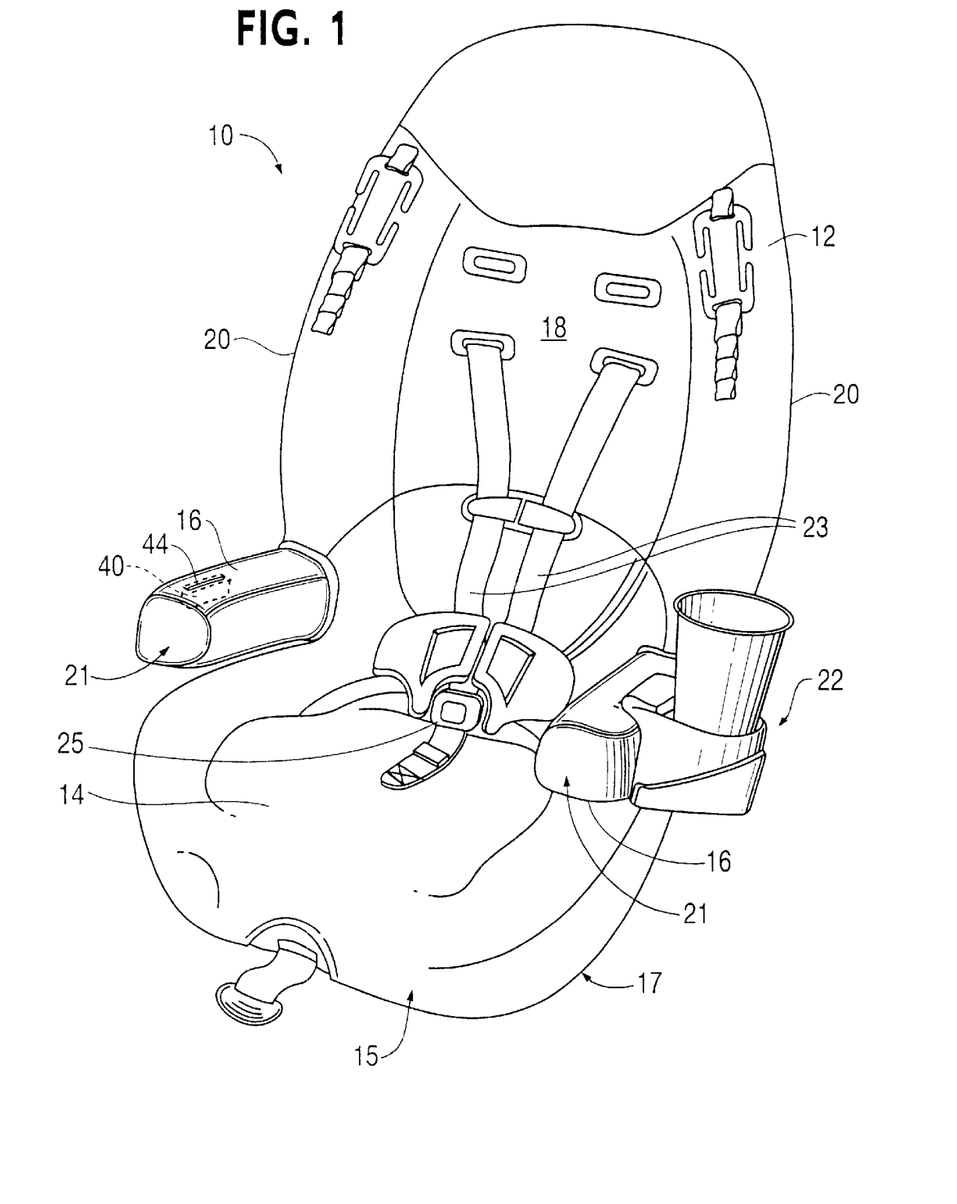
FIG. 1 a perspective view of a child car seat in accordance with the subject invention.

Referring now to the drawings, wherein identical numerals indicate like parts, and initially to FIG. 1, there will be seen a child car seat, generally indicated 10, showing an operative context of the invention. The car seat 10 includes a backrest 12, a seat portion 14, and a pair of cantilever armrests 16. The seat portion 14 has a front edge 15 and a rear edge (not visible). The seat portion 14 also has a seat bottom 17 adapted to be placed on a seat cushion of a vehicle; it will be understood that "placed" in this context means either that the seat bottom 17 may be placed directly on the seat cushion or it may be attached to a seat adapter placed on the seat cushion. The backrest 12 extends upwardly from the back edge of the seat portion 14.

Figure 1A:
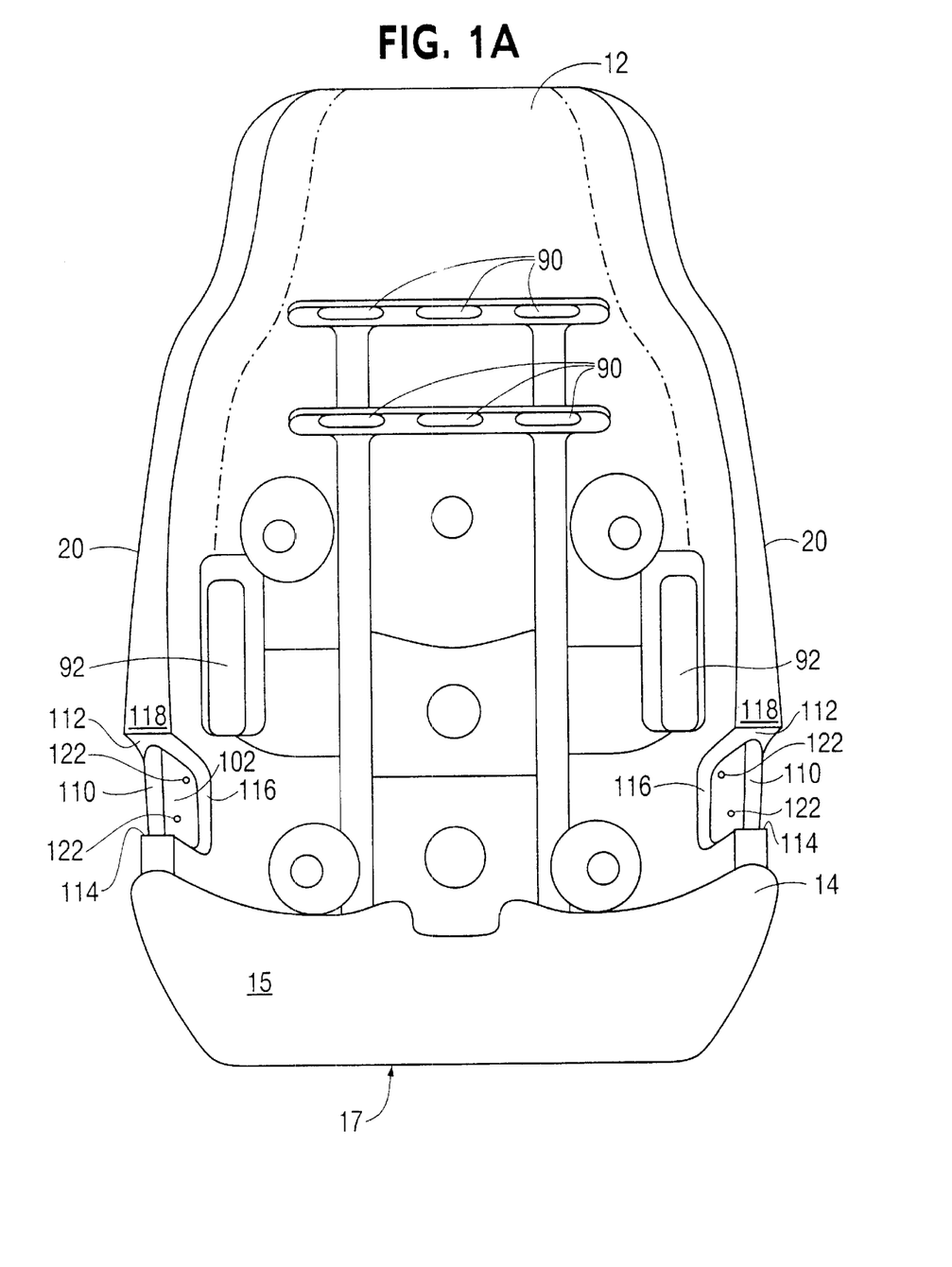
FIG. 1A is a front view of a car seat shell in accordance with the subject invention.
Figure 1B:
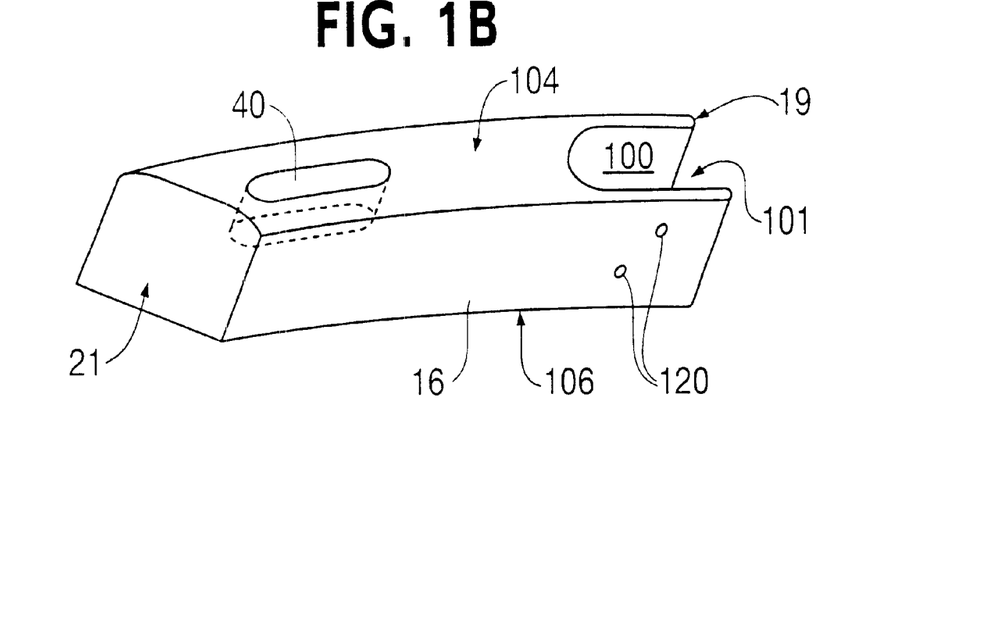
FIG. 1B is a perspective view of a cantilever armrest in accordance with the subject invention.

The cantilever armrests 16 have a first end 19 and a second end 21, as shown by the representative cantilever armrest 16 of FIG. 1B. The first end 19 of the cantilever armrests 16 are attached to the backrest 14. The armrests 16 are cantilevered in that the armrests are supported at only one end, i.e., the first end 19, and the other, second end 21 remains free from structural attachment to the backrest 12 or seat portion 14. These cantilever armrests 16 thus differ from U-shaped shields, such as disclosed in U.S. Pat. No. 5,662,378, which completely encircle the child and attach to the backrest of the car seat at both ends of the shield. Further, the cantilever armrests 16 are vertically spaced from the seat portion 14 along the entire length of the armrests 16. The length of the armrests 16 is greater than one half a length of the seat portion 14 from the back edge to the front edge 15. As shown in FIG. 1, the cantilever armrests 16 extend out from the backrest 12, above the seat portion 14, at a height from the seat portion 14 generally equal to the distance between a child's elbow and the child's seat. Accordingly, a child may rest his or her forearms on the cantilever armrests 16.

The child car seat 10 also includes a child restraint system connectable to the child car seat for holding the child in place. The child restraint system generally includes belts, e.g., 23, and buckles, e.g., 25, that may be adjusted to fit snugly against the child.

In FIG. 1, padding is shown covering the backrest 12, the seat portion 14, and the armrests 16. FIG. 1A, on the other hand, illustrates the shell of the child car seat, which includes the backrest 12 and seat portion 14, without padding and prior to attachment of the cantilever armrests 16. In the preferred embodiment, the backrest 12 and the seat portion 14 are integrally molded in a unitary structure. The backrest 12 includes first and second sides 20 to which the cantilever armrests 16 are rigidly attached.

Attachment of the cantilever armrests to the backrest is accomplished via attachment of a first mounting surface at the first end 19 of the cantilever armrests 16 to a second mounting surface on the backrest 12. The first mounting surface confronts and is connected to the second mounting surface to attach the cantilever armrest 16 to the backrest 12. Description of bow the cantilever armrests 16 are attached to the backrest 12 in a preferred embodiment of the invention now will be made with reference to FIGS. 1A and 1B.

Referring first to FIG. 1B, the first mounting surface comprises an inner surface 100 of a groove 101 formed at the first end 19 of the cantilever arm 16. The groove 101 is generally U-shaped in cross section. The U-shaped groove 101 opens in the direction of the first end 19 and extends from a top surface 104 of the cantilever arm 16 to a bottom surface 106 of the cantilever arm 16. Turning to FIG. 1A, the second mounting surface 102 comprises an exterior surface of a tongue 110 formed in a recess at each side 20 of the backrest 12. The tongue 110 may be recessed from a forward facing surface 118 of the backrest. The tongue 110 has a height that is substantially equal to the height of the groove 101 in the cantilever armrest 16. When the groove 101 is channeled over the tongue 110, the top and bottom surfaces 104, 106, respectively, of the armrest 16 abut upper and lower shelves 112, 114, respectively, surrounding the tongue 110. In addition, the length of the groove 101 is substantially equal to the distance from the rear shelf 116 to the forward facing surface 118 of the backrest 12. Once the tongue-in-groove attachment has been made between the grooves 101 in the cantilever armrests 16 and the respective recessed tongues 102 of the backrest 12, fasteners, such as bolts, rivets, or other conventional fasteners, are channeled through holes 120 in the cantilever armrests 16 and corresponding holes 122 in the recessed tongues 110. When the cantilever armrests 16 are attached to the backrest 12, the armrests 16 are in parallel alignment with the seat portion 14. The grooves 101 and tongues 110 may be configured, however, so that the armrests 16 are positioned at a slight upward or downward angle relative to the seat portion 14.

It will be understood by those skilled in the art that the tongue-in-groove attachment is one among many that may provide a rigid attachment between a first mounting surface of a cantilever armrest and a second mounting surface on a backrest. This invention contemplates alternative embodiments that employ a first mounting surface and a second mounting surface to attach the cantilever armrests to the backrest. For example, the connection between the armrest and the backrest may be accomplished by an interleaved arrangement, where the first end 19 of the cantilever armrest 16 includes plural fins that interleave with fins molded at an appropriate location into the forward facing surface 118 of the backrest. Alternatively, the grooved first end 19 of the armrest 16 may be replaced by a single tab-like extension that may be rigidly attached to either side surface the tongue 110, i.e., a lap joint. Further, the first end 19 of the armrest 16 may be formed with a rounded protuberance adapted to be inserted into a socket in the forward facing surface 118 of the backrest. As a further alternative to the above described methods of attaching the cantilever armrests to the backrest, the armrests 16 may be attached to the backrest 12 by being integrally molded therewith.

In addition to the second mounting surface, the backrest 12 includes a first set of apertures, e.g., 90, for receiving the belts in the child restraint system and a second set of apertures, e.g., 92, for passage of the lap belt of the car therethrough.

Although FIG. 1 shows the armrests 16 extending out from tongues 110 located at the forward facing surface 118 of the backrest 12, the armrests 16 also may be rigidly attached to either side surface 20 of the backrest 12 at an appropriate height. When the armrests 16 are attached to the side surfaces 20, the area where the child sits is wider.

The cantilever armrests 16 themselves are generally slightly arcuate in shape, as shown in FIG. 1B, with a concave side surface confronting the child and a convex, oppositely facing side surface. The arcuate armrests embrace a child seated in the car seat. Alternatively, the armrests 16 may be rectangular in shape as shown in FIG. 1.

Another embodiment of the invention contemplates a child car seat where the backrest has first and second openings therethrough adjacent the first and second sides of the backrest. The child car seat of this embodiment further includes a generally U-shaped structure, where the two legs of the U-shaped structure pass through the first and second openings to define first and second cantilever armrests, and the cross member of the U-shaped structure wraps around the rear surface of the backrest. In a modification of this embodiment, the backrest includes a horizontal concave area on a front surface thereof, and the cross member of the generally U-shaped structure is received in the horizontal cavity, with the two legs extending out from the backrest to define first and second cantilever armrests.

Figure 3:
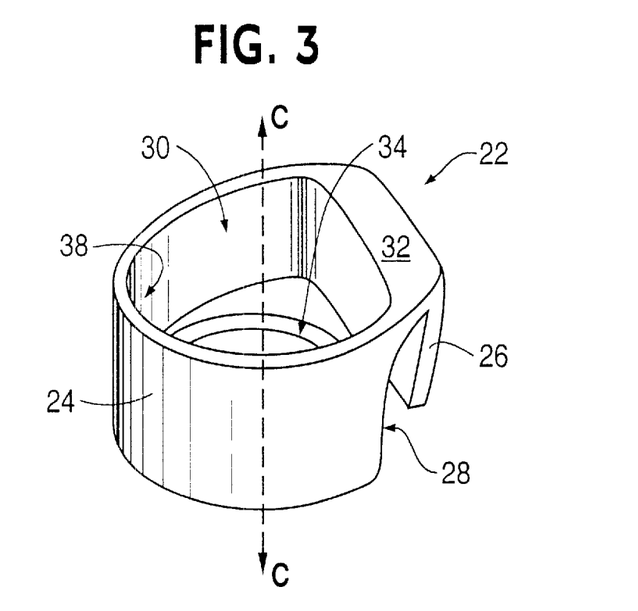
FIG. 3 is a perspective view of a beverage container holder in accordance with the invention.

Another feature of the present invention is to provide at least one of the cantilever armrests 16, and preferably both, with a receptacle, such as slot 40, formed therein for removably receiving a beverage container holder. A beverage container holder, generally indicated 22, is shown in FIG. 3. In a preferred embodiment, the beverage container holder 22 has a main body and a flange 26. The main body has a curved side 24 particularly suited for hugging a drink cup, as shown in FIG. 1, and a relatively straight side 28. The flange 26 extends downward from a top surface 32 of the beverage container holder 22, in a direction parallel to a central axis C—C of the beverage container holder, and is spaced from the straight side 28 of the main body 24. When the beverage container holder 22 is positioned in the armrest 16, a portion of the cantilever armrest 16 extends between the flange 26 and the straight side 28.

The main body 24 has a cavity 30, extending down from the top surface 32 of the beverage container holder 22, that is sized to hold relatively soft and flexible drink cups, juice boxes, and the like. In the preferred embodiment, the bottom of the main body 24 has a circular recess 34 therein to receive the base of a cup. It will be understood that that shape of the recess 34 is not limited to a circular shape; the recess may be configured in a variety of shapes, depending on the shape of the base of the beverage containers. For example, the recess may be sized or shaped to hold the rectangular base of a juice box. Although the preferred embodiment includes a curved side 24, it will be understood that side 24 may be of a different shape. For example, side 24 and straight side 28 may form a rectangle to better accommodate rectangular beverage containers such as juice boxes. Of course, the embodiment shown in FIGS. 1 and 3 will also hold an appropriately sized rectangular juice box.

Figure 2:
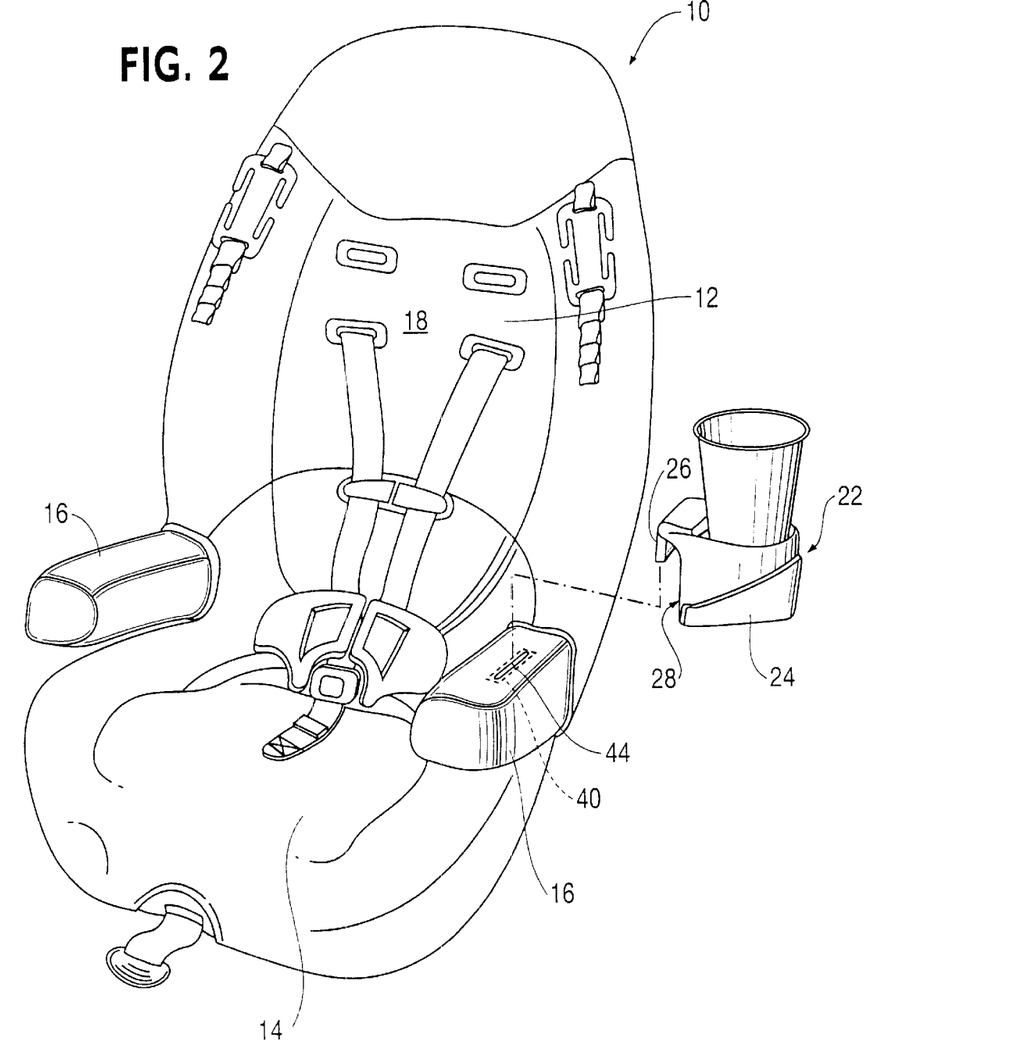
FIG. 2 is a perspective view of a child car seat with the beverage container holder removed from the cantilever armrest.
Figure 4:
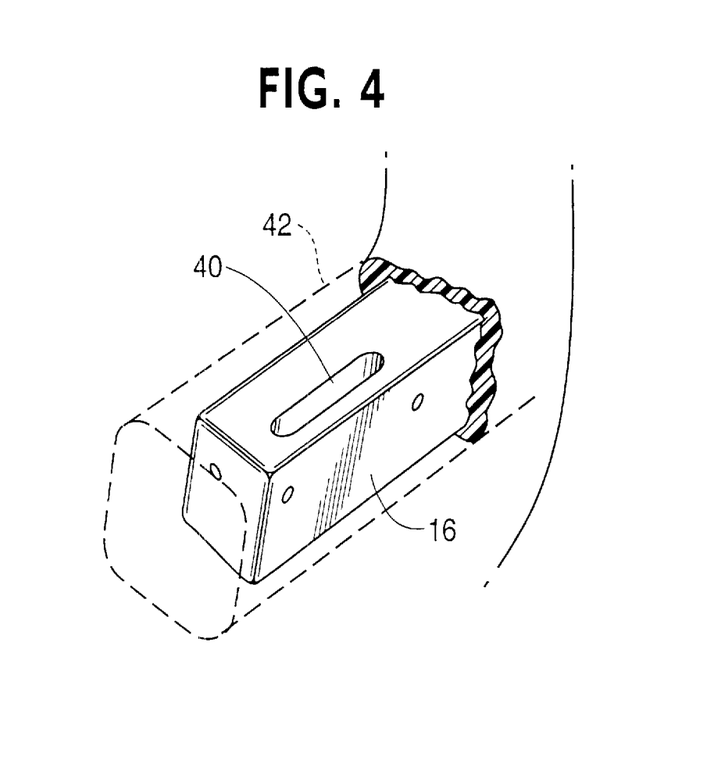
FIG. 4 is a perspective view of a cantilever armrest, showing the receptacle for a beverage container holder.

As mentioned above, at least one of the cantilever armrests 16 includes a receptacle, preferably a slot 40 as shown in FIG. 4. The slot 40 is shaped to receive the flange 26 of the beverage container holder 22. Padding 42 normally covers the armrest 16. To allow access to the slot 40, the padding 42 has a slit 44, similar to a buttonhole, at a location above and in juxtaposition with the slot 40, as seen in FIG. 2. The slit 44 of FIG. 2 is exaggerated for illustrative purposes. The side flange 26 of the beverage container holder 22 may be slid through the slit 44 in the padding 42 and into the slot 40. In a preferred embodiment, the slit 44 is along a seam and simply is formed by leaving the seam open at a location above the slot 40 of the armrest 16. The slot 40 thus would not be readily visible to a person looking at the armrest 16. FIG. 2 illustrates how the beverage container holder 22 may be slid into the slit 44 in the armrest padding 42.

Other beverage container holder configurations and techniques for attaching a beverage container holder to an armrest are contemplated by the present invention. For example, in one alternative embodiment, the beverage container holder does not include a flange, but rather includes an elastic sleeve attached to the beverage container holder's outer surface. The beverage container holder of this embodiment is attached to the armrest by slipping the elastic sleeve over the armrest. This beverage container holder may be attached to either the left or the right armrest, depending on the preference of the child or the parent. For example, with a car seat positioned on the left side of the car, it may be preferable to position the beverage container holder on the right armrest to make it easier for a parent seated in the front seat to reach the beverage container holder. In another alternative embodiment, the beverage container holder may be attached to the armrest with a hook and loop type fastening arrangement. Here, the armrest has a patch of either hook or loop material, and the beverage container holder has a patch of the complementary material. In yet another embodiment, the armrest may be fitted with a sleeve that has a fastener to which a beverage container holder with a complementary fastener may be engaged when desired. For example, the beverage container holder may be fastened via a snap or latch to the sleeve on the armrest. Other forms of attaching the beverage container holder to the armrest are deemed to fall within the scope of the invention.

Figure 5:
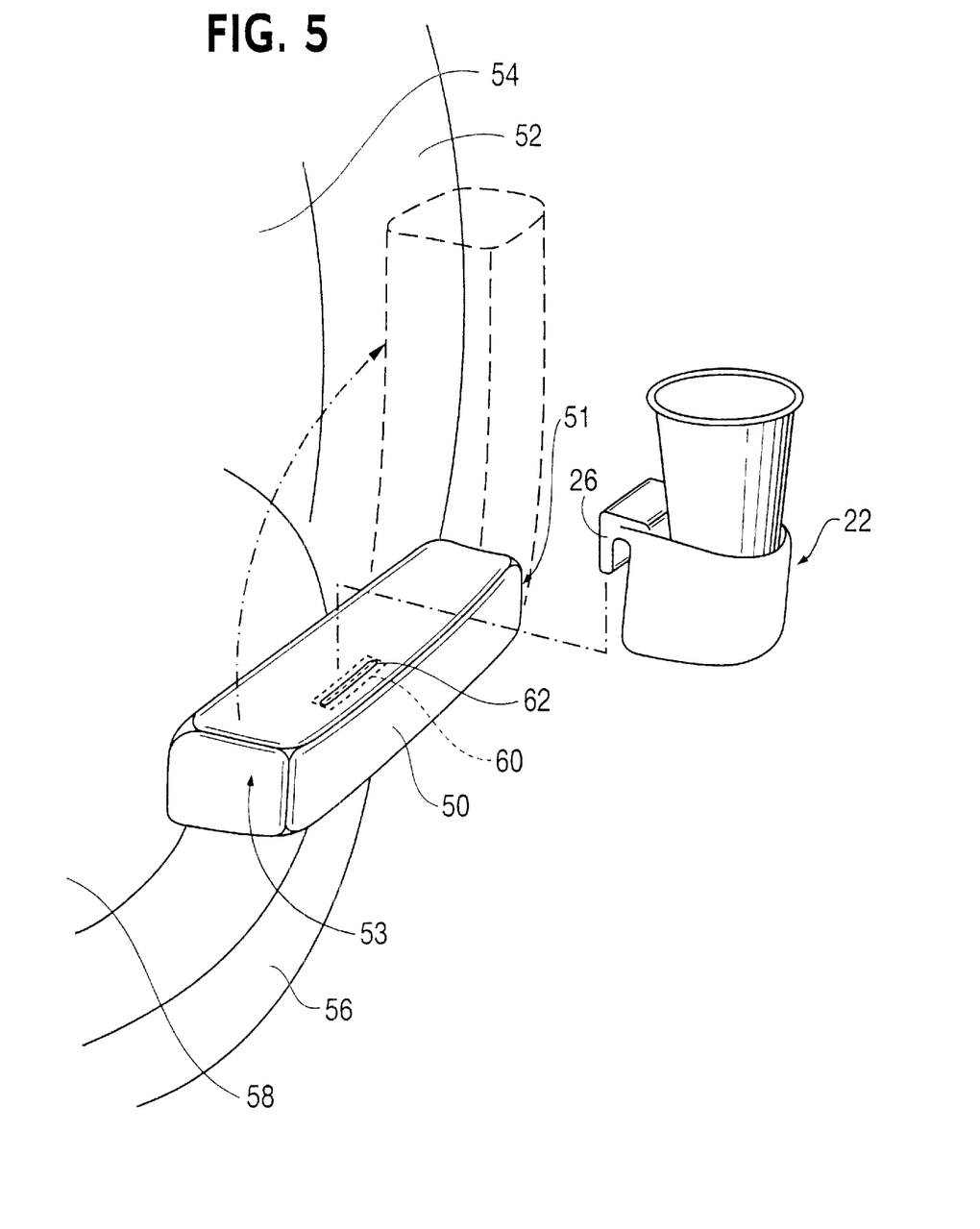
FIG. 5 is a perspective view of another embodiment of a child car seat in accordance with the invention, showing a pivotable, cantilever armrest attached to a side surface of the backrest.

The cantilever armrests of the present invention may also be pivotally attached to the backrest. As illustrated in FIG. 5, the pivotable armrest 50 may be attached to the side surface 52 of the backrest 54. This pivotable armrest 50, like the rigidly attached armrest 16 of FIGS. 1–4, is a cantilever armrest, supported on the backrest at only one end, i.e., a first end 51. The second end 53 is free. The armrest 50 pivots in at least one of an upward direction and a downward direction relative to the seat portion 58 and, in some embodiments, both directions. FIG. 5 shows the armrest 50 in a normal position in solid line, extending substantially perpendicularly from the backrest 54, and in dotted line in an upward pivoted position. The armrest 50 pivots up to a generally vertical position aligned with the side surface 52 of the backrest 54. In pivotable embodiments where the armrests pivot down, the armrests preferably pivot to a position beside the outer surface 56 of the seat portion 58. An advantage of the pivotable armrest 50 is that the parent may pivot the armrest 58 out of the way to create room for maneuvering the child into place in the child car seat.

Like the rigid armrests 16 shown in FIGS. 1–4, the pivotable armrest 50 of FIG. 5 includes a receptacle, preferably a slot, 60 for receiving the flange 26 of a beverage container holder 22, and the padding of the armrest 50 includes a slit 62 in juxtaposition with the receptacle 60 through which the flange 26 may be slid.

Figure 6:
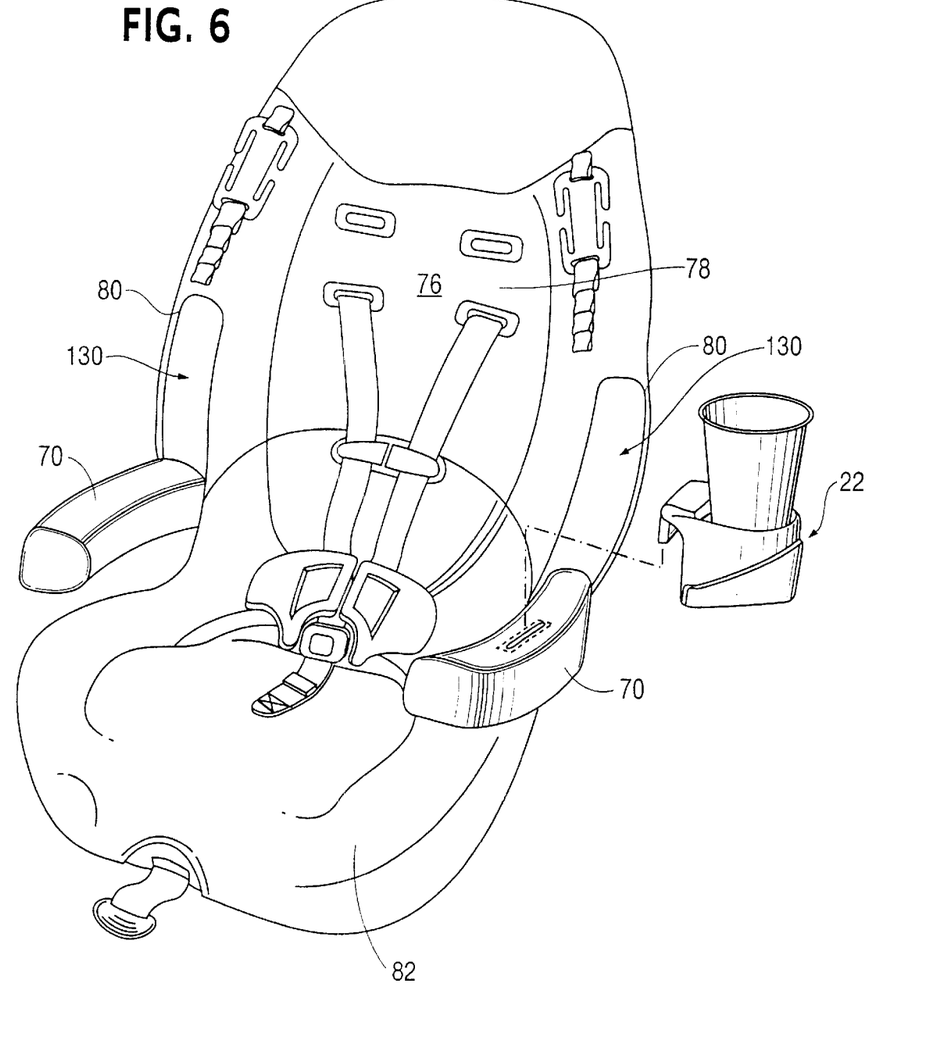
FIG. 6 is a perspective view of yet another embodiment of a child car seat in accordance with the invention, showing pivotable, cantilever armrests attached to each side of the backrest.
Figure 6A:
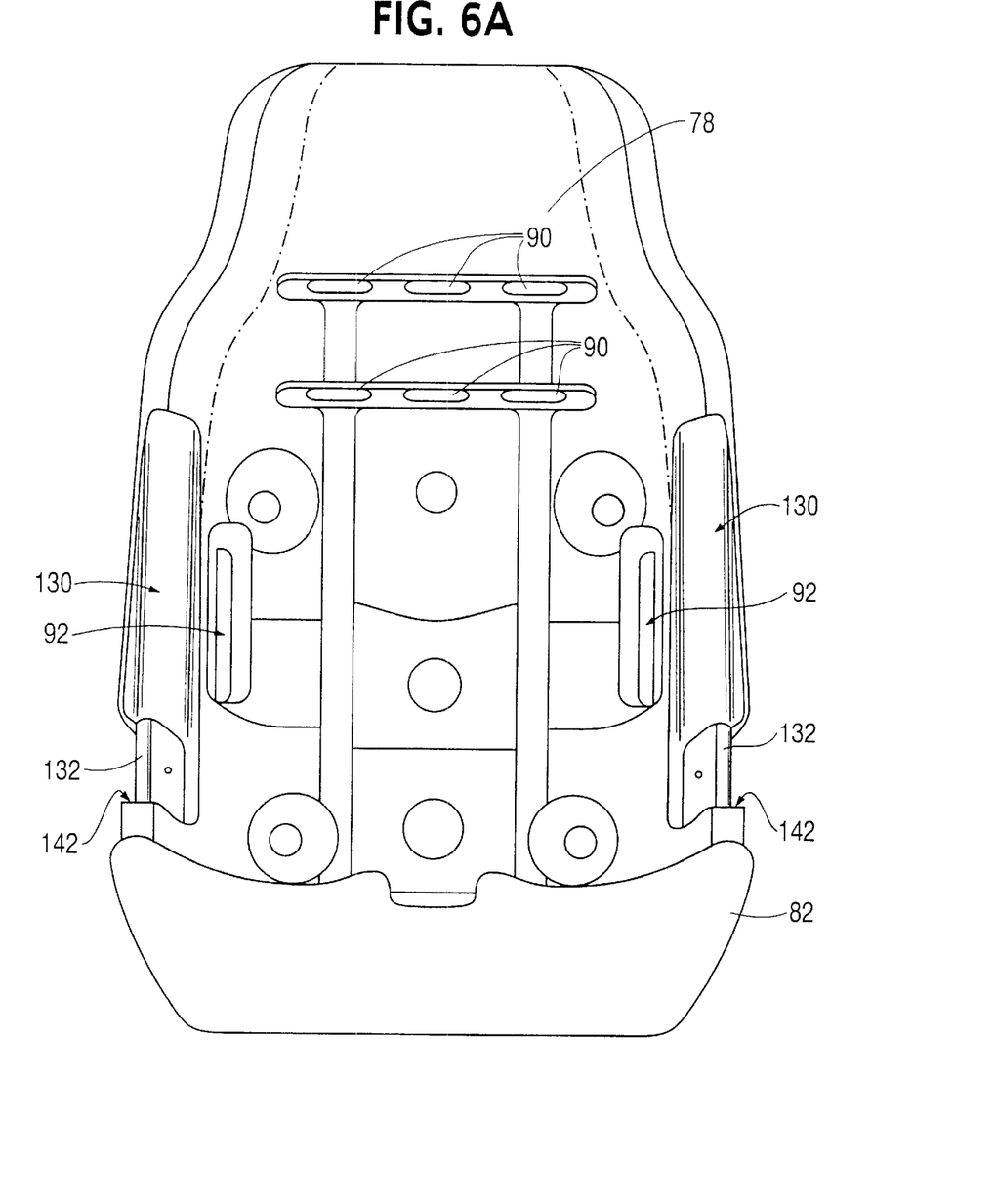
FIG. 6A is a front view of a car seat shell in accordance with the embodiment shown in FIG. 6.
Figure 6B:
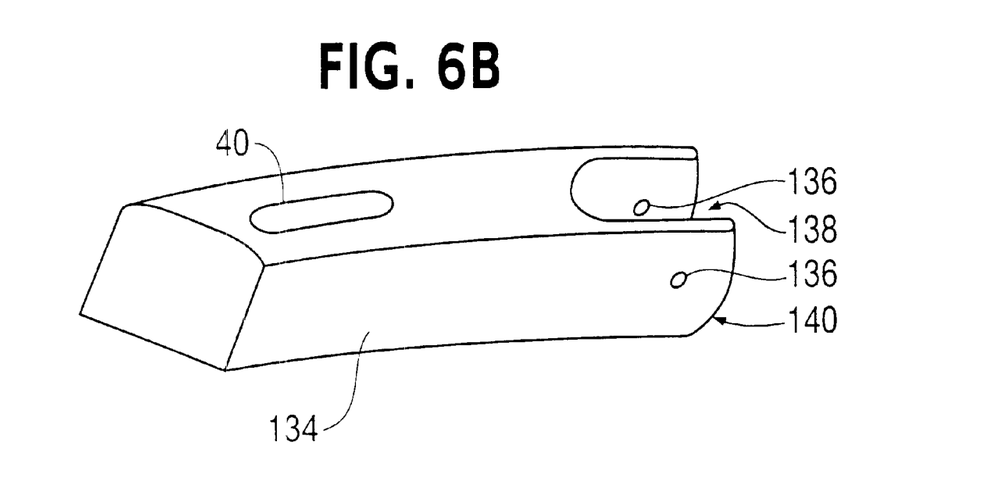
FIG. 6B is a perspective view of a cantilever armrest in accordance with the embodiment shown in FIG. 6.

FIGS. 6, 6A, and 6B show another embodiment that uses a pivotable, cantilever armrest. In this embodiment, the armrests 70 are attached to either side 80 of the backrest 78. The backrest 78 preferably includes a pair of recessed areas 130 for receiving the armrests 70 when pivoted upward. The backrest 78 may also have armrests that pivot downward (not shown), in which case the seat portion 82 would include recessed areas for receipt of the armrests. As shown in FIG. 6A, the shell of this embodiment includes a pivot attachment member 132 for pivotal connection of each armrest. An armrest 134 suitable for use in this embodiment is shown in FIG. 6B. As compared to the armrest 16 of FIG. 1B, armrest 134 includes only one hole 136 on either side of groove 138, as opposed to two or more, so that the armrest 134 can pivot about pivot attachment member 132. In addition, the distance between the hole 136 and the end surface 140 of the first end of the armrest 134 is sufficiently small such that, when pivoted, the end surface 140 clears the lower shelf 142 surrounding the base of the pivot attachment member 132.

Figure 7:
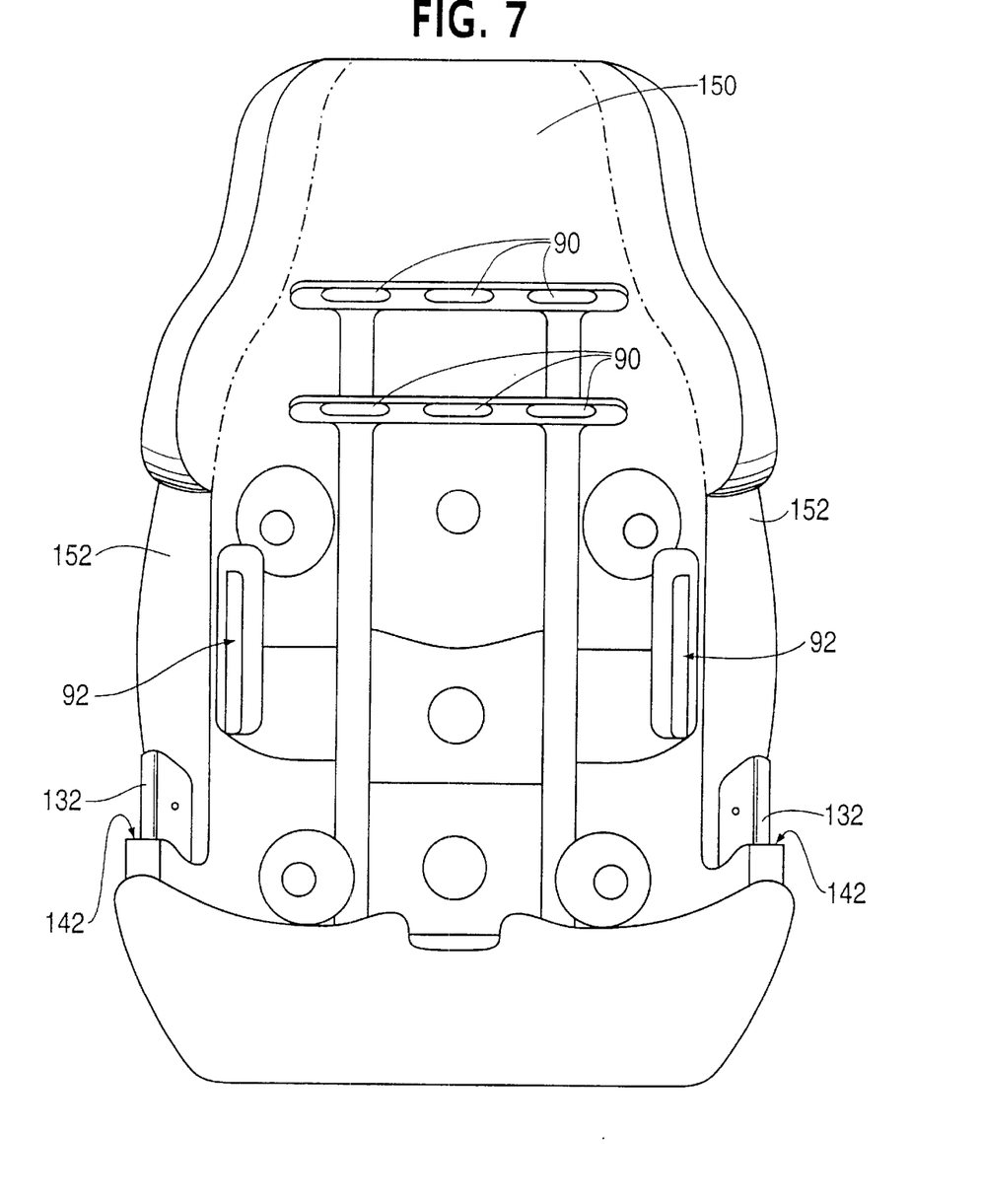
FIG. 7 is a front view of an alternative embodiment of a car seat shell adapted for use with pivotable, cantilever armrests attached to each side of the backrest.

FIG. 7 illustrates an alternative embodiment of a car seat shell adapted for use with pivotable, cantilever armrests. The backrest 150 of this embodiment includes contoured cut-out areas 152 on either side into which the armrests may pivot. In an embodiment where the cantilever armrests pivot downward, the seat portion may include a contoured cut-out area on each side of the seat portion.

In describing the invention, reference has been made to a preferred embodiment and illustrative advantages of the invention. Those skilled in the art, however, and familiar with the instant disclosure of the subject invention, may recognize that numerous other modifications, variations, and adaptations may be made without departing from the scope of the invention as defined in the claims.

We claim:

1. A child seat arrangement for use on a vehicle seat comprising:
    a seat portion having a front edge, a back edge, and a bottom adapted to be placed on a seat cushion of a vehicle;
    a child restraint system adapted for holding a child in the child seat;
    a backrest extending upwardly from the back edge of the seat portion to define a seating area with the seat portion; and
    at least one cantilever armrest having a first end attached to the backrest and a second end extending away from the backrest, the cantilever armrest being vertically spaced from the seat portion along an entire length of the armrest, and the cantilever armrest having a longitudinal axis and a slot formed in an upper surface thereof with a major dimension along the longitudinal axis for removably mounting a beverage container holder to the cantilever armrest in a single orientation in relation thereto, such that the beverage container holder is positioned behind a plane defined by the second end of the armrest and is positioned on a side of the longitudinal axis opposite the seating area.

2. A child seat according to claim 1, wherein the cantilever armrest includes first and second cantilever armrest attached to opposite sides of the backrest.

3. A child seat according to claim 2, wherein the cantilever armrests each are one-piece structures.

4. A child seat according to claim 2, wherein the cantilever armrests are rigidly attached to the backrest.

5. A child seat according to claim 2, wherein the first end of each of the armrests includes a first mounting surface, and the backrest has a second mounting surface on either side of the backrest for connecting the cantilever armrests to the sides of the backrest.

6. A child seat according to claim 2, wherein the cantilever armrests are pivotally attached to the backrest.

7. A child seat according to claim 1, wherein the cantilever armrest curves outward relative to a center of the child seat.

8. A child seat according to claim 1, wherein the cantilever armrest is pivotally attached to the backrest such that the cantilever armrest pivots in at least one of a direction toward the backrest and a direction toward the seat portion.

9. A child seat according to claim 8, wherein the backrest includes a recessed area for receiving the cantilever armrest when pivoted toward the backrest.

10. A child seat arrangement for use on a vehicle seat comprising:
    a seat portion having a front edge, a back edge, and a bottom adapted to be placed on a seat cushion of a vehicle;
    a child restraint system adapted for holding a child in the child seat;
    a backrest extending upwardly from the back edge of the seat portion to define a seating area with the seat portion;
    a pair of cantilever armrests having a first end attached to the backrest and a second end, the armrests being vertically spaced from the seat portion along an entire length of the armrests, the armrests each having a longitudinal axis, and at least one of the armrests having a slot formed in an upper surface thereof with a major dimension along the longitudinal axis; and
    a beverage container holder removably mounted in the slot of the at least one armrest in a single orientation in relation thereto, such that the beverage container holder is positioned behind a plane defined by the second end of the armrest and is positioned on a side of the longitudinal axis opposite the seating area.

11. A child seat according to claim 1, wherein the beverage container holder has a main body and a flange that removably fits into the slot in the cantilever armrest.

12. A child seat according to claim 11, wherein the main body of the beverage container holder has a cavity for receiving a beverage container.

13. A child seat according to claim 11, wherein the flange extends downward from a top surface of the beverage container holder, in a direction parallel to a central axis of the main body, and is spaced from the main body.

* * * * *